United States Patent
Hashimoto et al.

(10) Patent No.: US 9,212,605 B2
(45) Date of Patent: Dec. 15, 2015

(54) DRIVE DEVICE FOR VEHICLE AUXILIARY MACHINE

(71) Applicant: Nissan Motor Co., Ltd., Yokohama-shi, Kanagawa (JP)

(72) Inventors: Shin Hashimoto, Kawasaki (JP); Kentarou Watanabe, Yokohama (JP); Takeshi Yamamoto, Yokosuka (JP); Masaaki Kubo, Yokohama (JP); Katsuhiko Sando, Isehara (JP); Ryusei Matsuoka, Tosa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/420,919

(22) PCT Filed: Sep. 3, 2013

(86) PCT No.: PCT/JP2013/073696
§ 371 (c)(1),
(2) Date: Feb. 11, 2015

(87) PCT Pub. No.: WO2014/038554
PCT Pub. Date: Mar. 13, 2014

(65) Prior Publication Data
US 2015/0211414 A1 Jul. 30, 2015

(30) Foreign Application Priority Data
Sep. 10, 2012 (JP) ................... 2012/198071

(51) Int. Cl.
*F02B 39/12* (2006.01)
*F16H 13/04* (2006.01)
(Continued)

(52) U.S. Cl.
CPC . *F02B 67/04* (2013.01); *B60K 6/22* (2013.01); *B60K 6/36* (2013.01); *B60K 6/40* (2013.01); *B60K 6/48* (2013.01); *B60K 25/02* (2013.01);
(Continued)

(58) Field of Classification Search
CPC .................. B60K 2025/022; B60Y 2400/424; B60W 10/108
See application file for complete search history.

(56) References Cited

U.S. PATENT DOCUMENTS 5,931,759 A * 8/1999 Otaki ....................... B62M 6/40
475/183
8,057,353 B2 * 11/2011 Yamamoto .............. F16H 15/46
476/59

(Continued)

FOREIGN PATENT DOCUMENTS

| JP | 2002-201975 A | 7/2002 |
| JP | 2002-534315 A | 10/2002 |
| JP | 2004-28153 A | 1/2004 |

*Primary Examiner* — Ramya Burgess
*Assistant Examiner* — Mark Manley
(74) *Attorney, Agent, or Firm* — Global IP Counselors, LLP

(57) ABSTRACT

A drive apparatus for a vehicle auxiliary device is provided that basically includes first and second drive sources, an auxiliary device, first, second and third rollers, first, second and third idler rollers and a roller pair selection mechanism. The first, second and third rollers are linked to rotary shafts of the first and second drive sources and the auxiliary device. The first, second and third idler rollers are disposed at gap positions formed between the first, second and third rollers. The roller pair selection mechanisms select a power-transmitting roller pair from among the first, second and third rollers by selectively moving the first, second and third idler rollers in roller contact directions, thereby interposing the first, second and third idler rollers therebetween.

19 Claims, 11 Drawing Sheets

(51) Int. Cl.
  *F16D 15/00* (2006.01)
  *F16D 21/02* (2006.01)
  *F02B 67/04* (2006.01)
  *B60K 6/48* (2007.10)
  *F16H 13/02* (2006.01)
  *F02B 39/04* (2006.01)
  *B60K 6/36* (2007.10)
  *B60W 10/108* (2012.01)
  *B60W 10/30* (2006.01)
  *B60K 6/22* (2007.10)
  *B60K 6/40* (2007.10)
  *F02D 29/02* (2006.01)
  *F02D 29/04* (2006.01)
  *F16H 13/10* (2006.01)
  *F16H 37/14* (2006.01)
  *B60K 25/00* (2006.01)
  *B60K 25/02* (2006.01)

(52) U.S. Cl.
  CPC ............ *B60W 10/108* (2013.01); *B60W 10/30* (2013.01); *F02B 39/04* (2013.01); *F02D 29/02* (2013.01); *F02D 29/04* (2013.01); *F16H 13/02* (2013.01); *F16H 13/10* (2013.01); *F16H 37/14* (2013.01); *B60K 2025/005* (2013.01); *B60K 2025/022* (2013.01); *B60Y 2400/424* (2013.01); *F16D 15/00* (2013.01); *Y02T 10/6221* (2013.01); *Y10S 903/902* (2013.01); *Y10T 74/19014* (2015.01)

(56) References Cited

U.S. PATENT DOCUMENTS

2006/0019786 A1   1/2006   Asa et al.
2006/0054374 A1   3/2006   Wimmer et al.
2008/0293529 A1   11/2008  Di Giacomo et al.
2009/0013952 A1   1/2009   Deniston et al.

* cited by examiner

SWITCHING USING FEMALE CAMS

SWITCHING USING FEMALE CAMS

DRIVE DEVICE FOR VEHICLE AUXILIARY MACHINE

CROSS-REFERENCE TO RELATED APPLICATIONS

This application is a U.S. National stage application of International Application No. PCT/JP2013/073696, filed Sep. 3, 2013, which claims priority to Japanese Patent Application No. 2012-198071 filed in Japan on Sep. 10, 2012. The entire disclosure of Japanese Patent Application No. 2012-198071 is hereby incorporated herein by reference.

BACKGROUND

1. Field of the Invention

The present invention relates to a drive apparatus for a vehicle auxiliary device that drives an auxiliary device mounted in a vehicle using one of two drive sources.

2. Background Information

There is known in the art a drive apparatus for a vehicle auxiliary device that has a transmission mechanism comprising pulleys provided on each of an engine crankshaft, a motor output shaft, and a compressor drive shaft, and a belt slung around the pulleys and drives auxiliary devices such as a compressor (see, for example, Japanese Laid-Open Patent Application No. 2002-201975).

SUMMARY

However, a conventional drive apparatus for a vehicle auxiliary device is configured so that all auxiliary devices and drive sources are driven by the same belt and pulleys. All auxiliary devices and drive sources thus constantly create drag, and friction from unnecessary drive sources or auxiliary devices is applied as a drive load that leads to the problem of increased energy loss.

The present invention was conceived with the problem described above in mind, it being an object thereof to provide a drive apparatus for a vehicle auxiliary device that is capable not only of minimizing frictional load when an auxiliary device is being driven, but also of minimizing energy loss by allowing an efficient drive source to be selected.

In order to achieve the object proposed above, a drive apparatus for a vehicle auxiliary device according to the present invention is assumed to be a drive apparatus for a vehicle auxiliary device provided with at least one auxiliary device that is driven by either a first drive source or a second drive source. In this drive apparatus for a vehicle auxiliary device, a roller is linked to each of a rotary shaft belonging to the first drive source, a rotary shaft belonging to the second drive source, and a rotary shaft belonging to the auxiliary device. Idler rollers are disposed at positions in gaps formed between the plurality of rollers linked to each of the rotary shafts. A roller pair selection mechanism is provided that selects a power-transmitting roller pair from among the plurality of rollers by moving an idler roller in a roller contact direction, thereby interposing the idler roller therebetween.

An idler roller is moved in the roller contact direction by a roller-pair-selecting mechanism, whereby a power-transmitting roller pair is selected from a plurality of rollers by the idler roller being interposed therebetween. Thus, when, for example, the auxiliary device is being driven by the first power source, a power transmission path is formed between the first drive source and the auxiliary device, and the second drive source is disconnected from the power transmission path. In other words, friction from an unnecessary drive source or auxiliary device is not applied as a drive load. It is also possible to select whichever of the first drive source and the second drive source is more efficient as the drive source for the auxiliary device. This arrangement of selecting a power-transmitting roller pair by moving an idler roller in a contact direction makes it possible not only to minimize frictional loads when an auxiliary device is being driven, but also to minimize energy loss by allowing an efficient drive source to be selected.

BRIEF DESCRIPTION OF THE DRAWINGS

Referring now to the attached drawings which form a part of this original disclosure.

DETAILED DESCRIPTION OF THE EMBODIMENTS

Figure 1:
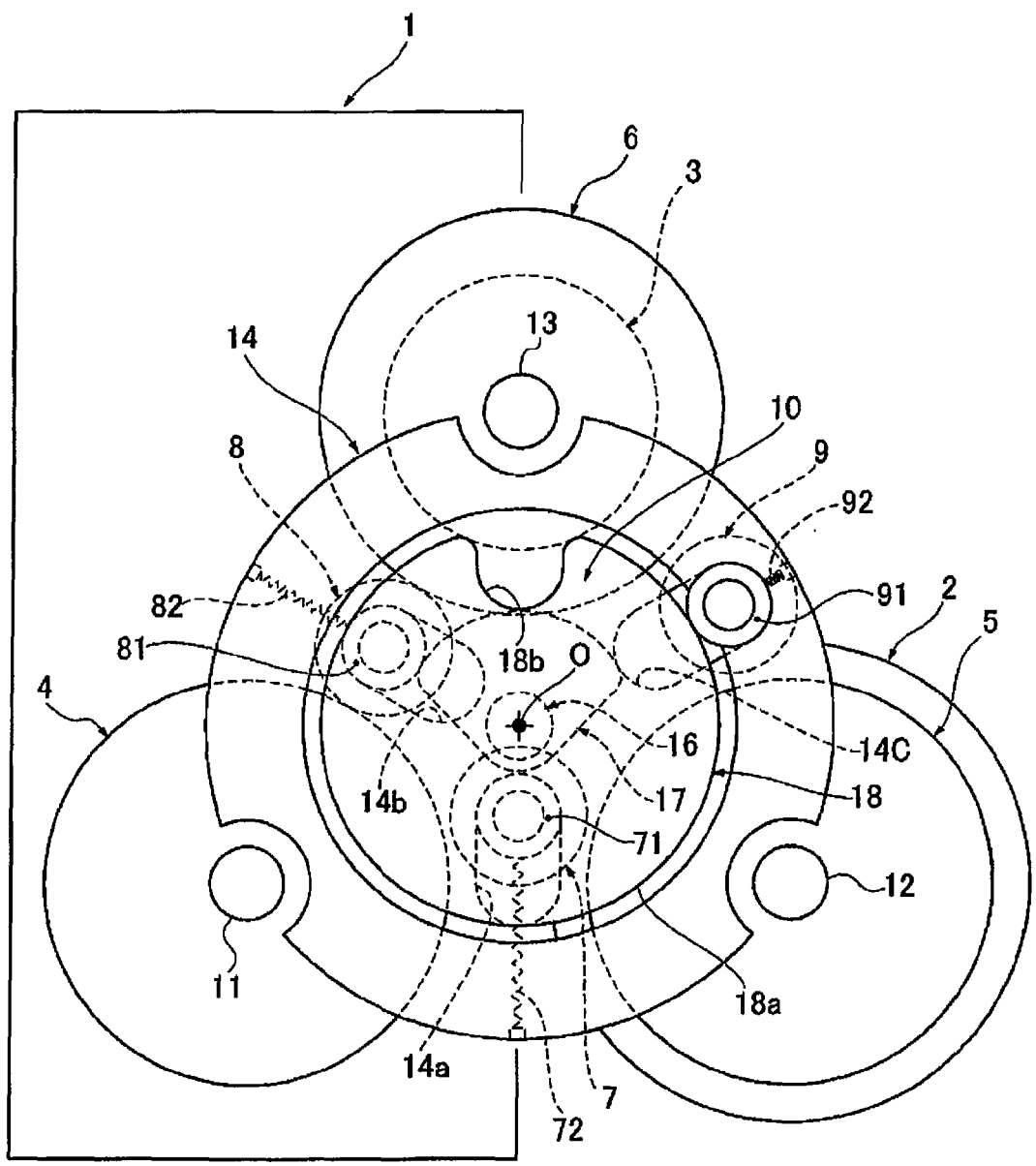
FIG. 1 is an overall schematic system chart of a drive apparatus for a vehicle auxiliary device according to a first embodiment.

The following is a description of a best mode for realizing the drive apparatus for a vehicle auxiliary device according to the present invention on the basis of a first embodiment and a second embodiment shown in the drawings.

Embodiment 1

First, the configuration of the first embodiment will be described. The description of the configuration of the drive apparatus for a vehicle auxiliary device according to the first embodiment will be divided into the sections "Overall system configuration" and "Roller pair selection configuration".

Overall System Configuration

FIG. 1 shows a drive apparatus for a vehicle auxiliary device according to a first embodiment. The following is a description of the overall system configuration based on FIG. 1.

The drive apparatus for a vehicle auxiliary device according to the first embodiment is applied to a hybrid vehicle, with an engine 1 (first drive source), a motor/generator 2 (second drive source), and a compressor 3 (auxiliary device) being mounted therein, as shown in FIG. 1. Also provided are an engine roller 4, a motor/generator roller 5, and a compressor roller 6 as drive transmission elements. A first idler roller 7, a second idler roller 8, and a third idler roller 9 are provided as idler rollers for selecting a power transmission path. Also provided is a roller pair selection mechanism 10 for moving the idler rollers 7, 8, 9 in a radial direction when selecting a power transmission path.

The compressor 3 compresses a heating medium in an air conditioning system for performing climate control within the vehicle cabin, and is driven by one drive source out of the engine 1 and the motor/generator 2.

The engine roller 4 is linked to a crankshaft 11 (rotary shaft) of the engine 1. The motor/generator roller 5 is linked to a motor shaft 12 (rotary shaft) of the motor/generator 2. The compressor roller 6 is linked to a compressor shaft 13 (rotary shaft) of the compressor 3. As shown in FIG. 1, the rollers 4, 5, 6 have identical diameters, and are supported at both ends so as to be rotatable with respect to a circular carrier case 14. The rollers are disposed at equal intervals (120° intervals) around a circle having a central axis O constituted by a selector shaft 16 (rotary shaft) of an actuator 15 (see FIGS. 2 and 3) provided in the roller pair selection mechanism 10. The circumferential-direction gaps formed between each two adjacent rollers of the rollers 4, 5, 6 are smaller than the diameter of the idler rollers 7, 8, 9.

The first idler roller 7 is disposed in a circumferential-direction gap formed between the engine roller 4 and the motor/generator roller 5. The second idler roller 8 is disposed in a circumferential-direction gap formed between the engine roller 4 and the compressor roller 6. The third idler roller 9 is disposed in a circumferential-direction gap formed between the motor/generator roller 5 and the compressor roller 6. As shown in FIG. 1, the idler rollers 7, 8, 9 have identical diameters, and are disposed so as to be capable of radial direction movement in a first elongated hole 14a, a second elongated hole 14b, and a third elongated hole 14c opened in the carrier case 14 in the respective circumferential-direction gaps.

The roller pair selection mechanism 10 selects a power-transmitting roller pair from among the three rollers 4, 5, 6 by moving the idler rollers in a roller contact direction so as to interpose one or two of the idler rollers 7, 8, 9 therebetween.

Roller Pair Selection Configuration

FIG. 2 shows the roller pair selection mechanism of the drive apparatus for a vehicle auxiliary device according to the first embodiment selecting and switching between roller pairs using a male cam, and FIG. 3 shows the same selecting and switching using a female cam. The roller pair selection configuration will now be described with reference to FIGS. 1-3.

The roller pair selection mechanism 10 comprises male cams 17 (cams) and female cams 18 (cams) that convert the rotational movement of the actuator 15 to radial directional movement of the idler rollers 7, 8, 9. The male cams 17 and female cams 18 are provided integrally with the selector shaft 16, and a power-transmitting roller pair is selected by altering the rotational angular positions of the male cams 17 and the female cams 18 using the actuator 15.

As shown in FIG. 1, the first idler roller 7 is provided with first bearing supporters 71 that rotatably support the first idler roller 7 and are capable of moving in a radial direction from a radially inward position within the first elongated hole 14a in the carrier case 14 to a radially outward position. The radially inward sides of the first bearing supporters 71 contact the male cams 17, and the radially outward sides of the first bearing supporters 71 are biased in an inward radial direction by a first spring 72. The first idler roller 7 remains out of contact with the roller pair 4, 5 when at the radially inward position in the first elongated hole 14a, and contacts the roller pair 4, 5 when at the radially outward position in the first elongated hole 14a. In other words, the first idler roller 7 contacts the rollers by moving outward in the radial direction.

As shown in FIG. 1, the second idler roller 8 is provided with second bearing supporters 81 that rotatably support the second idler roller 8 and are capable of moving in a radial direction from a radially inward position within the second elongated hole 14b in the carrier case 14 to a radially outward position. The radially inward sides of the second bearing supporters 81 contact the male cams 17, and the radially outward sides of the second bearing supporters 81 are biased in an inward radial direction by a second spring 82. The second idler roller 8 remains out of contact with the roller pair 4, 6 when at the radially inward position in the second elongated hole 14b, and contacts the roller pair 4, 6 when at the radially outward position in the second elongated hole 14b. In other words, the second idler roller 8 contacts the rollers by moving outward in the radial direction.

As shown in FIG. 1, the third idler roller 9 is provided with third bearing supporters 91 that rotatably support the third idler roller 9 and are capable of moving in a radial direction from a radially inward position within the third elongated hole 14c in the carrier case 14 to a radially outward position. The radially inward sides of the third bearing supporters 91 contact the female cams 18, and the radially outward sides of the third bearing supporters 91 are biased in an inward radial direction by a third spring 92. The third idler roller 9 remains out of contact with the roller pair 5, 6 when at the radially outward position in the third elongated hole 14c, and contacts the roller pair 5, 6 when at the radially inward position in the third elongated hole 14c. In other words, the third idler roller 9 contacts the rollers by moving outward in the radial direction.

Figure 2A:
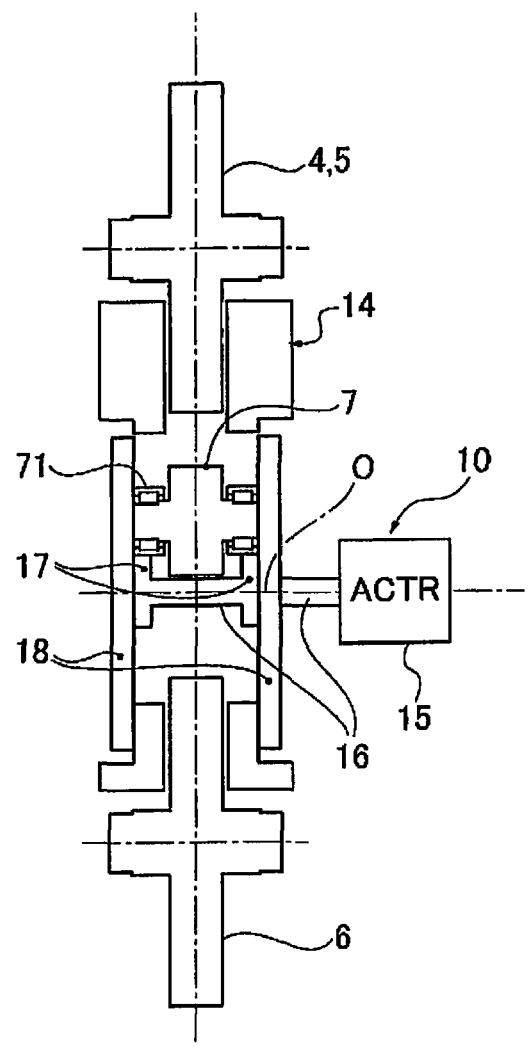
FIG. 2A is a roller non-contact cross-sectional view showing a roller pair selection mechanism of the drive apparatus for a vehicle auxiliary device according to the first embodiment selecting and switching between roller pairs using a male cam.
Figure 2B:
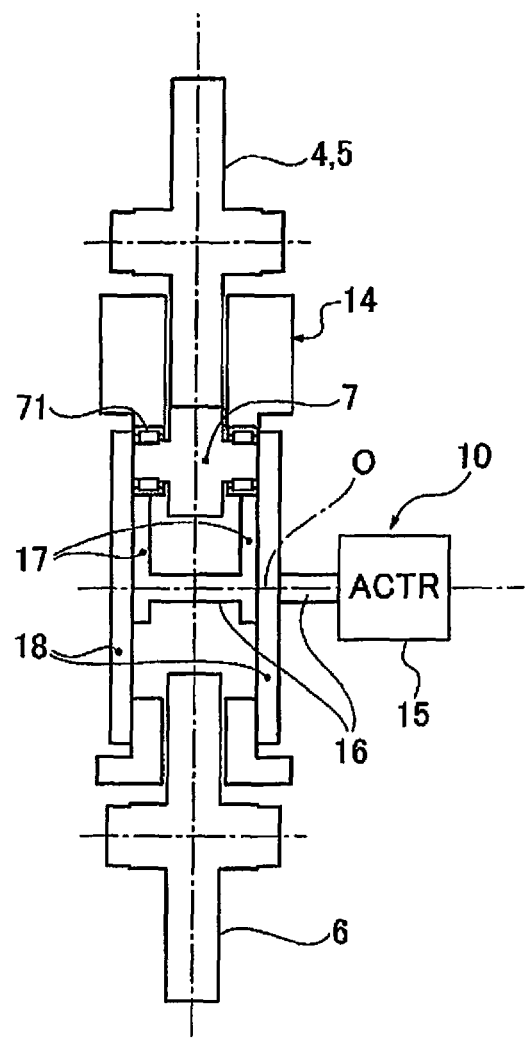
FIG. 2B is a roller contact cross-sectional view showing a roller pair selection mechanism of the drive apparatus for a vehicle auxiliary device according to the first embodiment selecting and switching between roller pairs using a male cam.

As shown in FIG. 1, the male cams 17 are fan-shaped cams that are connected to the selector shaft 16 at a position equivalent to the linchpin of the "fan", and convert the rotational movement of the actuator 15 to radial direction movement of the first idler roller 7 and the second idler roller 8. Specifically, as shown in FIG. 2A, when the male cams 17 in contact with the radially inward sides of the first bearing supporters 71 have a small cam diameter and the first idler roller 7 is at the radially inward position, the roller is out of contact with the roller pair 4, 5. Conversely, as shown in FIG. 2B, when the male cams 17 in contact with the radially inward sides of the first bearing supporters 71 have a large cam diameter and the first idler roller 7 moves in the radial direction from the radially inward position to the radially outward position, the roller contacts the roller pair 4, 5. Similarly, when the male cams 17 in contact with the radially inward sides of the second bearing supporters 81 have a small cam diameter and the second idler roller 8 is at the radially inward position, the roller is out of contact with the roller pair 4, 6. Meanwhile, when the male cams 17 in contact with the radially inward sides of the second bearing supporters 81 have a large cam diameter and the second idler roller 8 moves in the radial direction from the radially inward position to the radially outward position, the roller contacts the roller pair 4, 6.

Figure 3A:
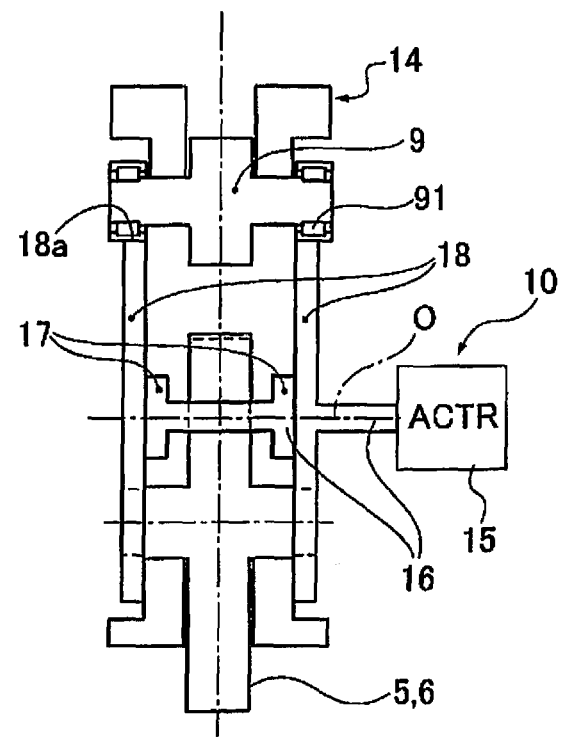
FIG. 3A is a roller non-contact cross-sectional view showing a roller pair selection mechanism of the drive apparatus for a vehicle auxiliary device according to the first embodiment selecting and switching between roller pairs using a female cam.
Figure 3B:
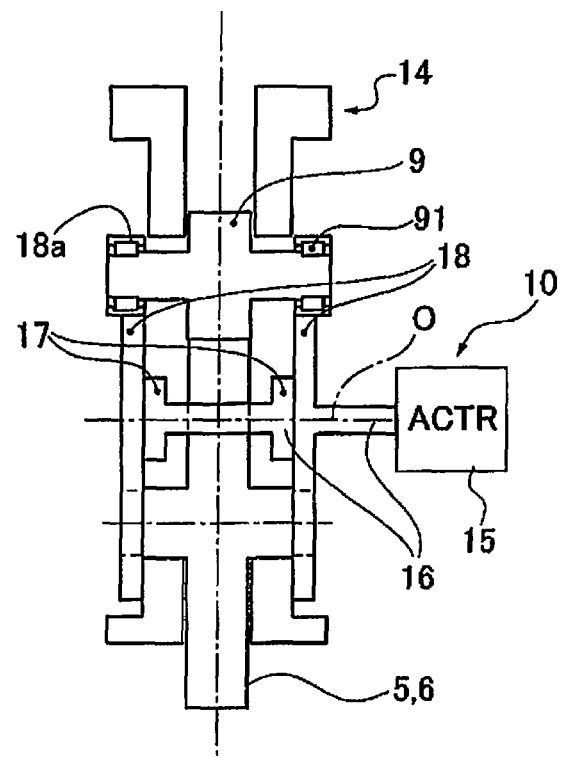
FIG. 3B is a roller contact cross-sectional view showing a roller pair selection mechanism of the drive apparatus for a vehicle auxiliary device according to the first embodiment selecting and switching between roller pairs using a female cam.

As shown in FIG. 1, the female cams 18 are disc-shaped cams in which a recess 18b is formed at one location on a circumferential section 18a, the selector shaft 16 being connected to central positions of the discs, and convert the rotational movement of the actuator 15 to radial direction movement of the third idler roller 9. Specifically, as shown in FIG. 3A, when the female cams 18 in contact with the radially inward sides of the third bearing supporters 91 have a large cam diameter (i.e., the circumferential section 18a) and the third idler roller 9 is at the radially outward position, the roller is out of contact with the roller pair 5, 6. Conversely, as shown in FIG. 3B, when the female cams 18 in contact with the radially inward sides of the third bearing supporters 91 have a small cam diameter (i.e., the recess 18b) and the third idler roller 9 moves in the radial direction from the radially outward position to the radially inward position, the roller contacts the roller pair 5, 6.

The roller pair selection mechanism 10 attains the following four drive transmission modes by selecting roller pairs.

(a) First Drive Transmission Mode

A mode using a power transmission path in which the first idler roller 7 is brought into contact with the engine roller 4 and the motor/generator roller 5.

(b) Second Drive Transmission Mode

A mode using a power transmission path in which the first idler roller 7 is brought into contact with the engine roller 4 and the motor/generator roller 5, and the second idler roller 8 is in contact with the engine roller 4 and the compressor roller 6.

(c) Third Drive Transmission Mode

A mode using a power transmission path in which the second idler roller 8 is brought into contact with the engine roller 4 and the compressor roller 6.

(d) Fourth Drive Transmission Mode

A mode using a power transmission path in which the third idler roller 9 is brought into contact with the motor/generator roller 5 and the compressor roller 6.

Next, the operation of the present embodiment will be described. The description of the operation of the drive apparatus for a vehicle auxiliary device according to the first embodiment will be divided into the sections "Roller pair selection-based auxiliary device drive operation", "First drive transmission mode operation", "Second drive transmission mode operation", "Third drive transmission mode operation", and "Fourth drive transmission mode operation."

Roller Pair Selection-Based Auxiliary Device Drive Operation

As described above, the first embodiment is configured so that a power-transmitting roller pair is selected from among the three rollers 4, 5, 6 by the roller pair selection mechanism 10 moving the idler rollers 7, 8, 9 in roller contact directions, thereby interposing the idler rollers 7, 8, 9 therebetween. Thus, when, for example, the compressor 3 constituting an auxiliary device is driven by the engine 1, a power transmission path is formed between the engine 1 and the compressor 3 by the rollers 4, 6 and the second idler roller 8, and the motor/generator 2 is disconnected from the power transmission path. When the compressor 3 constituting an auxiliary device is driven by the motor/generator 2, a power transmission path is formed between the motor/generator 2 and the compressor 3 by the rollers 5, 6 and the third idler roller 9, and the engine 1 is disconnected from the power transmission path. In other words, friction from an unnecessary drive source is not applied as a drive load. In addition, whichever of the engine 1 and the motor/generator 2 is more efficient can be selected as circumstances dictate as the drive source of the compressor 3 constituting an auxiliary device. A power-transmitting roller pair is thus selected by the movement of the idler rollers 7, 8, 9 in the contact directions, thereby not only allowing frictional load to be minimized when the compressor 3 is being driven, but also minimizing energy loss by allowing an efficient drive source to be selected.

In the first embodiment, the rollers 4, 5, 6 are disposed so as to form circumferential-direction gaps formed around a circle centered on a central axis O constituted by the selector shaft 16 of the actuator 15 provided in the roller pair selection mechanism 10, and the idler rollers 7, 8, 9 are disposed so as to be capable of radial direction movement within the circumferential-direction gaps. The roller pair selection mechanism 10 selects a power-transmitting roller pair using a cam mechanism for converting rotational movement of the actuator 15 to radial direction movement of the idler rollers 7, 8, 9. By virtue of this arrangement, the rollers 4, 5, 6 and idler rollers 7, 8, 9 are compactly disposed within a circular region centered on the central axis O, and a power-transmitting roller pair is selected using a cam mechanism employing a single actuator 15.

In the first embodiment, the first drive source is the engine 1, the second drive source is the motor/generator 2, and the auxiliary device is the compressor 3 of the hybrid vehicle, the device being driven by either the engine 1 or the motor/generator 2. A hybrid vehicle has an HEV driving mode in which both the engine 1 and the motor/generator 2 are driven, and an EV driving mode in which only the motor/generator 2 is driven. When transitioning from EV driving mode to HEV driving mode, the engine 1 may be started using the motor/generator 2 as a starter motor, and, in HEV driving mode, part of the drive force produced by the engine 1 may be used to generate power using the motor/generator 2. In addition, the drive source for the compressor 3 must be selected according to the driving mode. By contrast, by using the power-transmitting roller pair selection function not only as an auxiliary device drive source selection function but also as a clutch function that connects and disconnects power transmission between the two drive sources, it is possible to accommodate the function of forming the various power transmission paths required by a hybrid vehicle.

In the first embodiment, an arrangement possessing male cams 17 for converting rotational movement of the actuator 15 to radial direction movement of the first idler roller 7 and the second idler roller 8 and female cams 18 for converting rotational movement of the actuator 15 to radial direction movement of the third idler roller 9 has been adopted for the roller pair selection mechanism 10. This arrangement allows for switching between four drive transmission modes simply by controlling the rotational angle position of the actuator 15 and altering the radial direction-defining positions of the idler rollers 7, 8, 9 using the male cams 17 and the female cams 18.

First Drive Transmission Mode Operation

Figure 4:
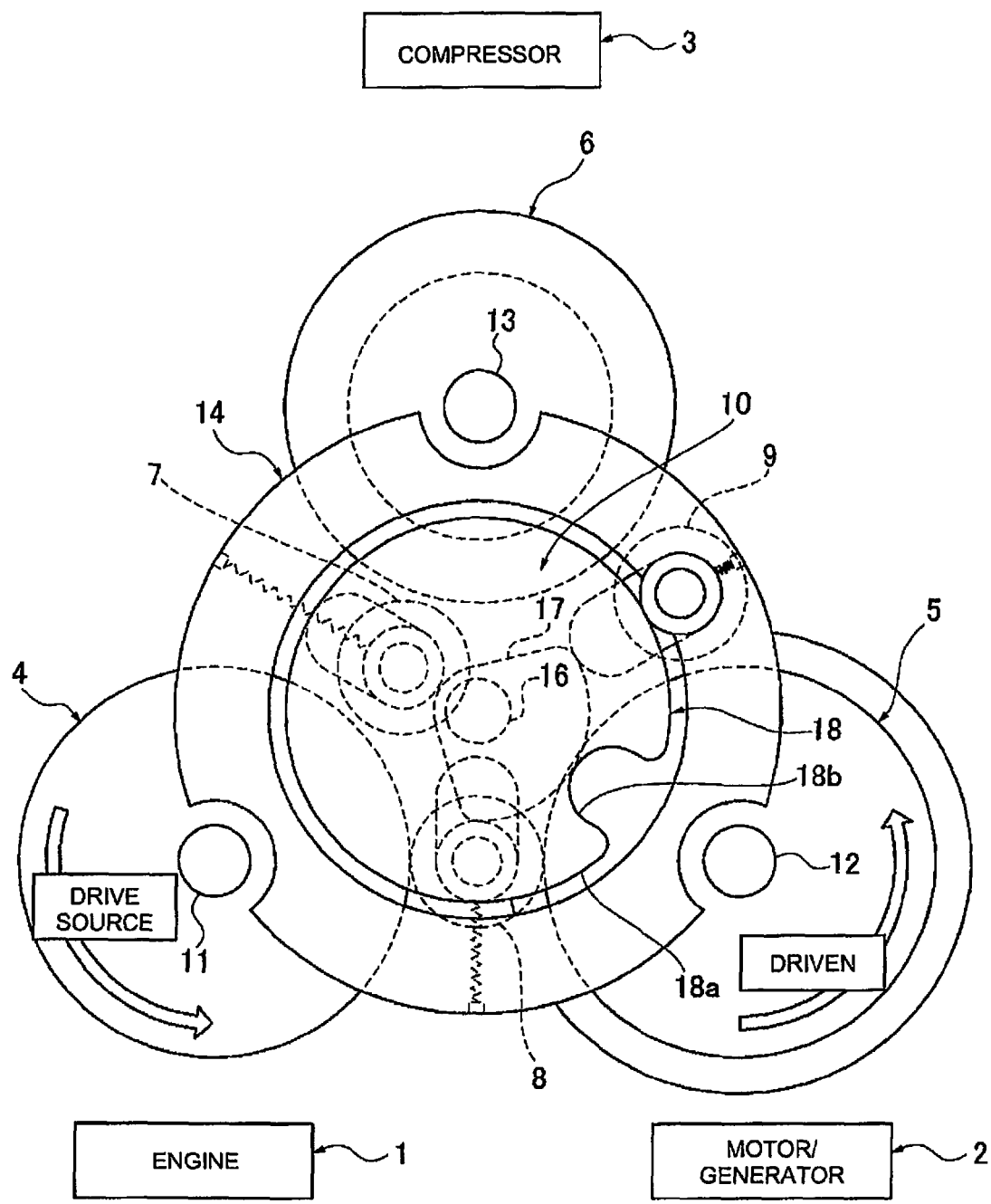
FIG. 4 is an operational illustration of a motor performing an engine start operation when a first drive transmission mode has been selected in the drive apparatus for a vehicle auxiliary device according to the first embodiment.
Figure 5:
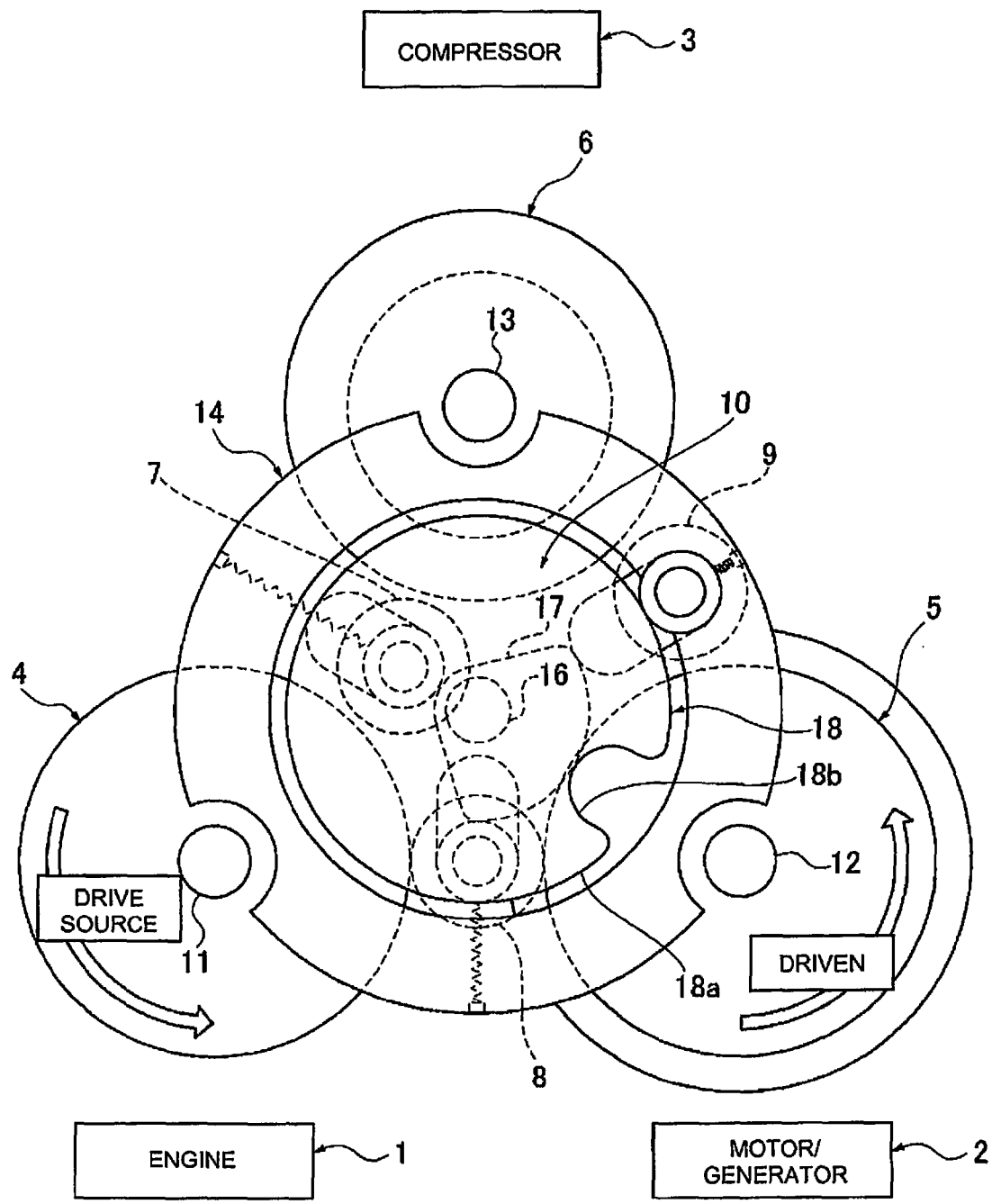
FIG. 5 is an operational illustration of an engine performing a power generation operation when a first drive transmission mode has been selected in the drive apparatus for a vehicle auxiliary device according to the first embodiment.

In the first drive transmission mode, which utilizes a power transmission path in which the first idler roller 7 is brought into contact with the engine roller 4 and the motor/generator roller 5, the engine start pattern shown in FIG. 4 and the engine power generation pattern shown in FIG. 5 are implemented. These two patterns will be described hereafter.

(Engine start pattern: FIG. 4)—In the engine start pattern, the drive source is the motor/generator 2, and the engine 1 is driven. In the engine start pattern, the selector shaft 16 is rotated by the actuator 15 to a position at which the first idler roller 7 contacts the engine roller 4 and the motor/generator roller 5, as shown in FIG. 4. In this state, the second idler roller 8 and the third idler roller 9 are at non-roller-contacting positions. When the rotation of the selector shaft 16 brings the first idler roller 7 into contact with the rollers 4, 5, a pressing force commensurate with the transmitted torque is automatically generated by the wedge effect between the motor/generator roller 5 and the first idler roller 7. This forms a power transmission path in which torque sequentially flows from the motor/generator 2 through the motor shaft 12, motor/generator roller 5, first idler roller 7, engine roller 4, and crankshaft 11 to the engine 1. As a result, the crankshaft 11 is rotated using the motor/generator 2 as a drive source, allowing the engine 1 to be started.

(Engine power generation pattern: FIG. 5)—In the engine power generation pattern, the drive source is the engine 1, and the motor/generator 2 is driven. In the engine power generation pattern, as in the engine start pattern, the selector shaft 16 is rotated by the actuator 15 to a position at which the first idler roller 7 contacts the engine roller 4 and the motor/generator roller 5, as shown in FIG. 5. In this state, the second idler roller 8 and the third idler roller 9 are at non-roller-contacting positions. Because an automatic wedge-effect-induced pressing cannot be expected even if the first idler roller 7 contacts the rollers 4, 5, the angular position of the selector shaft 16 is maintained. This forms a power transmission path in which torque sequentially flows from the engine 1 through the crankshaft 11, the engine roller 4, the first idler roller 7, the motor/generator roller 5, and the motor shaft 12 to the motor/generator 2. As a result, the motor shaft 12 is rotated using the engine 1 as a drive source, allowing power to be generated by the motor/generator 2.

Second Drive Transmission Mode Operation

Figure 6:
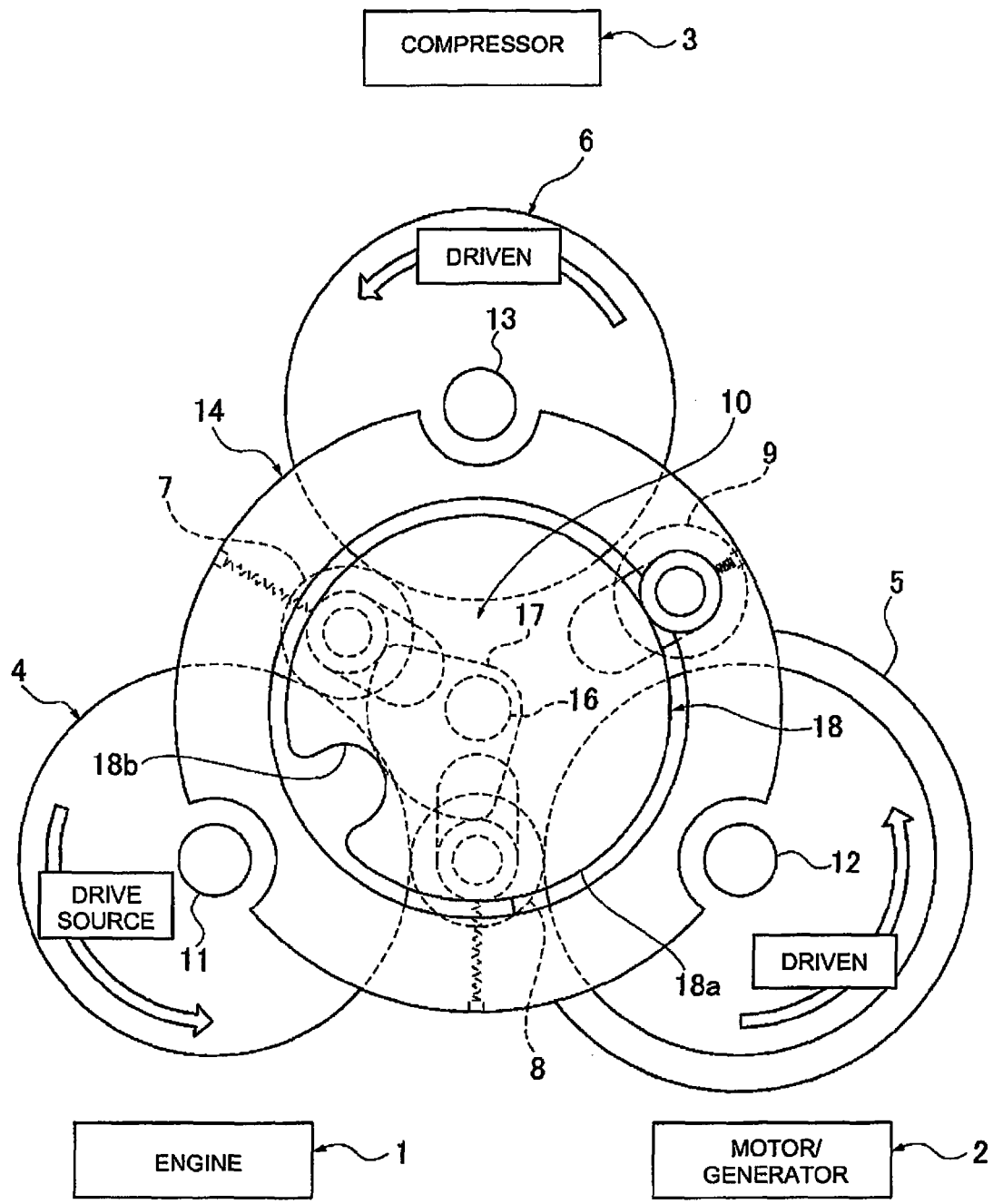
FIG. 6 is an operational illustration of an engine performing a power generation and air conditioner drive operation when a second drive transmission mode has been selected in the drive apparatus for a vehicle auxiliary device according to the first embodiment.

In the second drive transmission mode, which utilizes a power transmission path in which the first idler roller 7 is brought into contact with the engine roller 4 and the motor/generator roller 5 and the second idler roller 8 is brought into contact with the engine roller 4 and the compressor roller 6, a power generation and air conditioning drive pattern performed by the engine 1 as shown in FIG. 6 is implemented. In the power generation and air conditioning drive pattern performed by the engine 1, the drive source is the engine 1, and the motor/generator 2 and compressor 3 are driven.

In the power generation and air conditioning drive pattern performed by the engine 1, the selector shaft 16 is rotated by the actuator 15 to a position at which the first idler roller 7 contacts the engine roller 4 and the motor/generator roller 5, and the second idler roller 8 contacts the engine roller 4 and the compressor roller 6, as shown in FIG. 6. In this state, only the third idler roller 9 is at a non-roller-contacting position. Because an automatic wedge-effect-induced pressing cannot be expected even if the first idler roller 7 contacts the rollers 4, 5, the angular position of the selector shaft 16 is maintained. Meanwhile, when the rotation of the selector shaft 16 brings the second idler roller 8 into contact with the rollers 4, 6, a pressing force commensurate with the transmitted torque is automatically generated by the wedge effect between the engine roller 4 and the second idler roller 8. This forms a power transmission path in which torque sequentially flows from the engine 1 through the crankshaft 11, engine roller 4, first idler roller 7, motor/generator roller 5, and motor shaft 12 to the motor/generator 2. In addition, a power transmission path is formed in which torque sequentially flows from the engine 1 through the crankshaft 11, engine roller 4, second idler roller 8, compressor roller 6, and compressor shaft 13 to the compressor 3. As a result, using the engine 1 as a drive source, the motor shaft 12 is rotated, allowing power to be generated by the motor/generator 2, and the compressor shaft 13 is rotated, allowing the compressor of the air conditioner to be driven.

Third Drive Transmission Mode Operation

Figure 7:
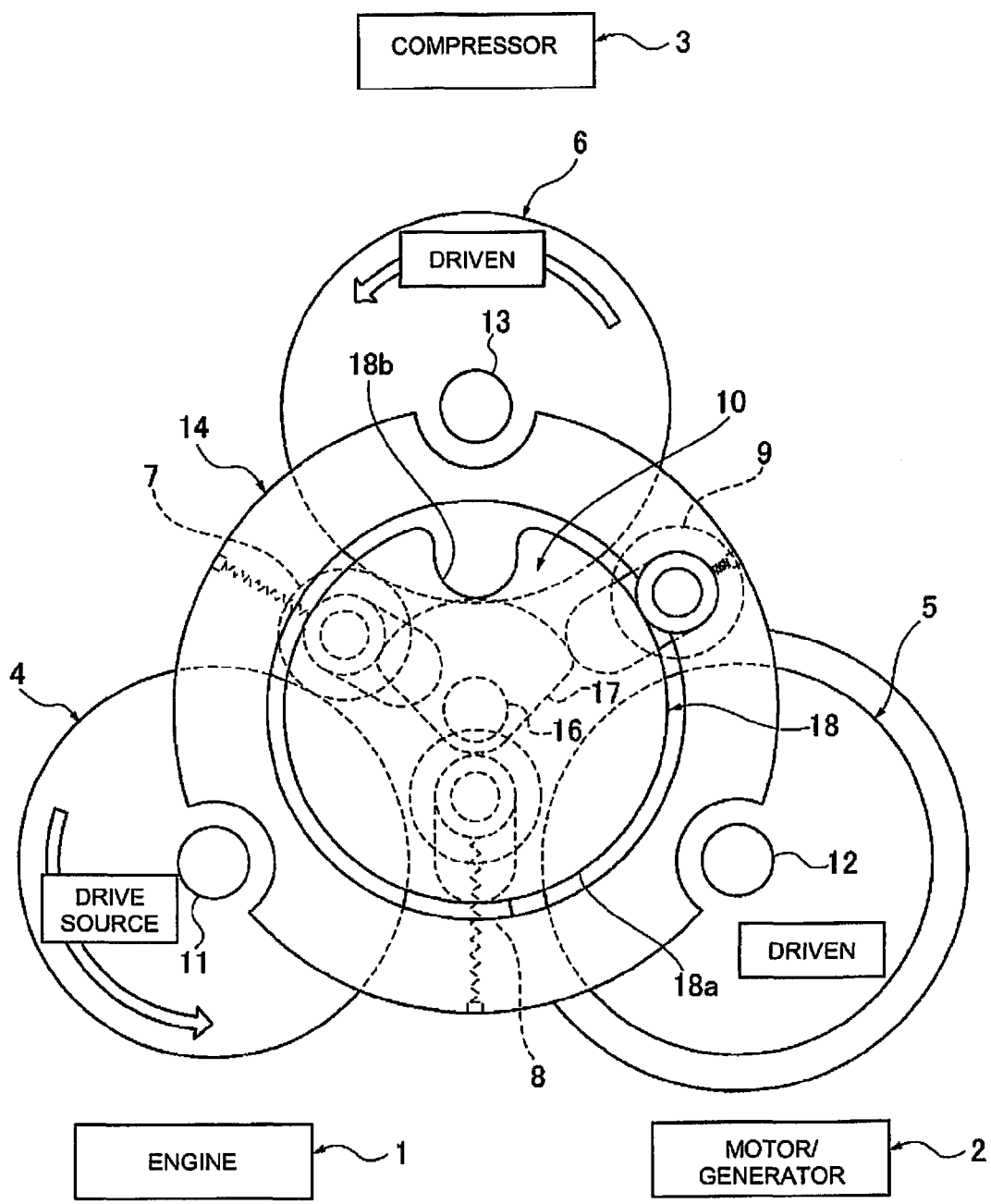
FIG. 7 is an operational illustration of an engine performing an air conditioner drive operation when a third drive transmission mode has been selected in the drive apparatus for a vehicle auxiliary device according to the first embodiment.

In the third drive transmission mode, which utilizes a power transmission path in which the second idler roller 8 is brought into contact with the engine roller 4 and the compressor roller 6, the engine air conditioner drive pattern shown in FIG. 7 is implemented. In the engine air conditioner drive pattern, the drive source is the engine 1, and the compressor 3 is driven.

In the engine air conditioner drive pattern, the selector shaft 16 is rotated by the actuator 15 to a position at which the second idler roller 8 contacts the engine roller 4 and the compressor roller 6, as shown in FIG. 7. In this state, the first idler roller 7 and the third idler roller 9 are at non-roller-contacting positions. When the rotation of the selector shaft 16 brings the second idler roller 8 into contact with the rollers 4, 6, a pressing force commensurate with the transmitted torque is automatically generated by the wedge effect between the engine roller 4 and the second idler roller 8. This forms a power transmission path in which torque sequentially flows from the engine 1 through the crankshaft 11, the engine roller 4, the second idler roller 8, the compressor roller 6, and the compressor shaft 13 to the compressor 3. As a result, the compressor shaft 13 is rotated using the engine 1 as a drive source, allowing the compressor of the air conditioner to be driven.

Fourth Drive Transmission Mode Operation

Figure 8:
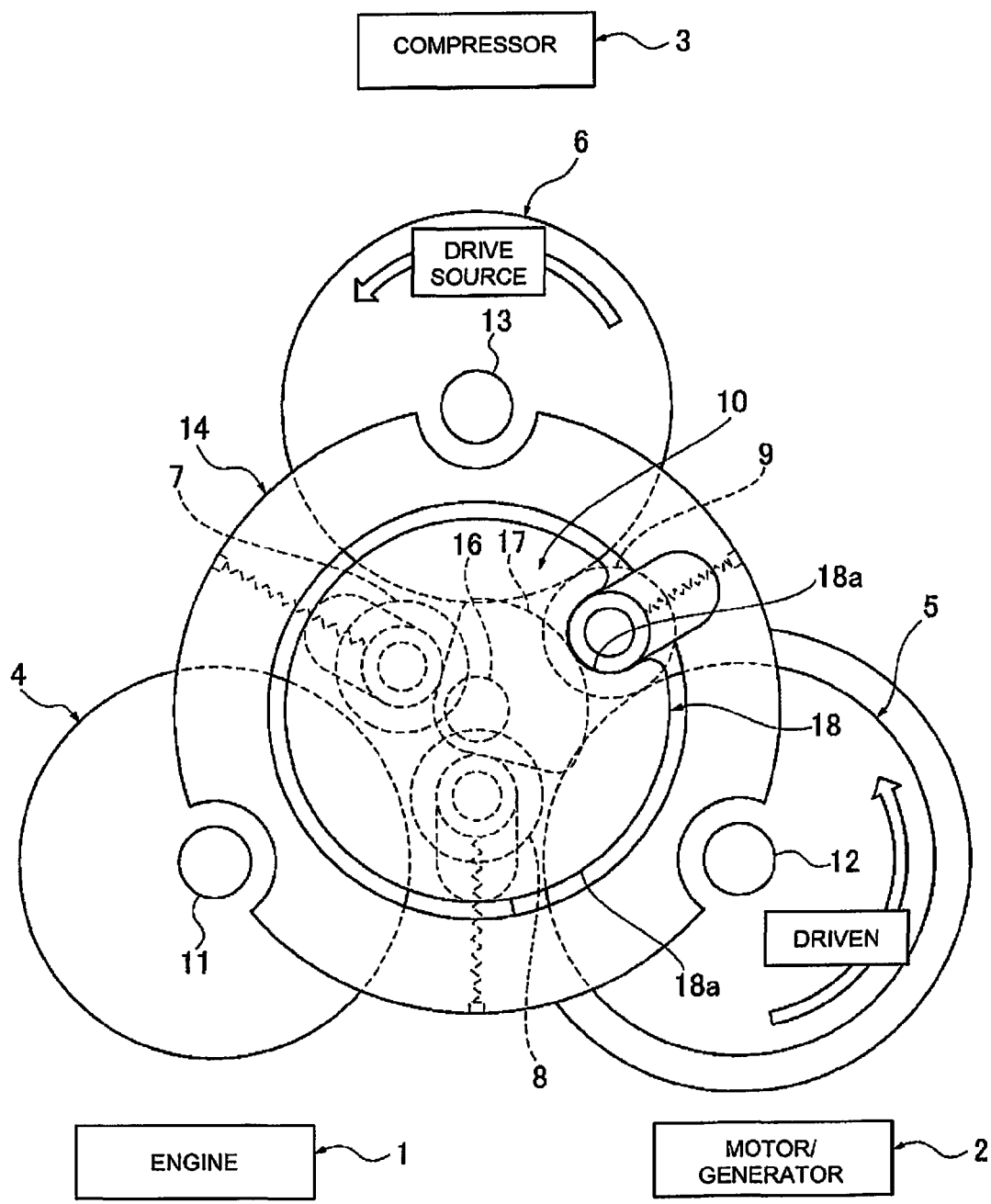
FIG. 8 is an operational illustration of a motor performing an air conditioner drive operation when a fourth drive transmission mode has been selected in the drive apparatus for a vehicle auxiliary device according to the first embodiment.

In the fourth drive transmission mode, which utilizes a power transmission path in which the third idler roller 9 is brought into contact with the motor/generator roller 5 and the compressor roller 6, the motor air conditioner drive pattern shown in FIG. 8 is implemented. In the motor air conditioner drive pattern, the drive source is the motor/generator 2, and the compressor 3 is driven.

Figure 9:
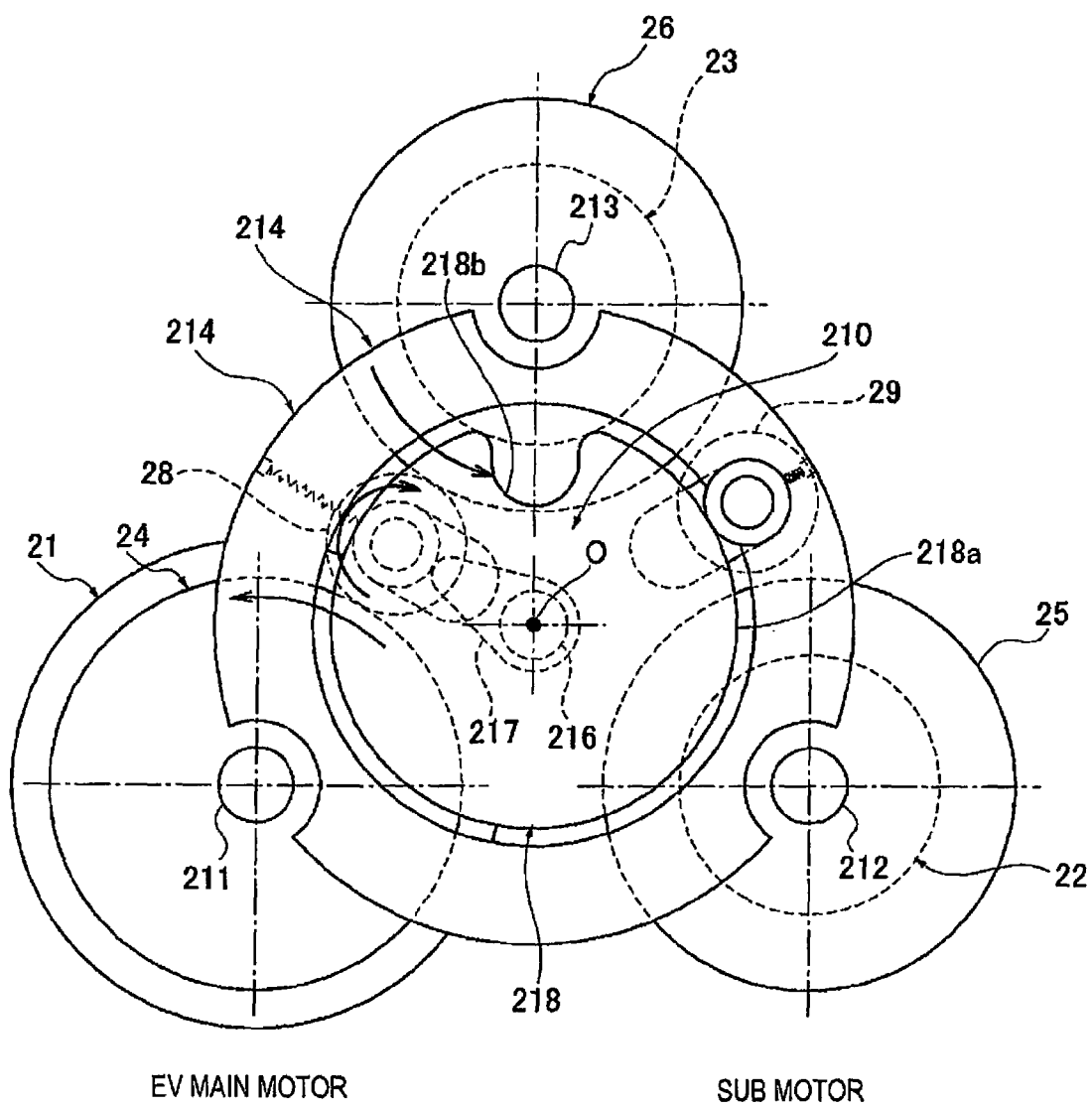
FIG. 9 is an operational illustration of a main motor performing an air conditioner drive operation in a drive apparatus for a vehicle auxiliary device according to a second embodiment.

In the motor air conditioner drive pattern, the selector shaft 16 is rotated by the actuator 15 to a position at which the third idler roller 9 contacts the motor/generator roller 5 and the compressor roller 6, as shown in FIG. 9. In this state, the first idler roller 7 and the second idler roller 8 are at non-rollercontacting positions. When the rotation of the selector shaft 16 bring the third idler roller 9 into contact with the rollers 5, 6, a pressing force commensurate with the transmitted torque is automatically generated by the wedge effect between the motor/generator roller 5 and the third idler roller 9. This forms a power transmission path in which torque sequentially flows from the motor/generator 2 through the motor shaft 12, motor/generator roller 5, third idler roller 9, compressor roller 6, and compressor shaft 13 to the compressor 3. As a result, the compressor shaft 13 is rotated using the motor/generator 2 as a drive source, allowing the compressor of the air conditioner to be driven.

In the motor air conditioner drive pattern, a neutral mode is implemented when the rotation of the selector shaft 16 keeps the third idler roller 9 at an angular rotational position before or after the position at which the roller falls into the recess 18b in the female cams 18 and contacts the rollers 5, 6, so that the roller does not fall into the recess 18b. In other words, none of the three idler rollers 7, 8, 9 contacts any of the three rollers 4, 5, 6 in neutral mode.

Next, the effects of the first embodiment will be described. The drive apparatus for a vehicle auxiliary device according to the first embodiment yields the following effects.

(1) A drive apparatus for a vehicle auxiliary device, the apparatus being provided with: a first drive source (engine 1); a second drive source (motor/generator 2) different from the first drive source (engine 1); and at least one auxiliary device (compressor 3) driven by one drive source out of the first drive source (engine 1) and the second drive source (motor/generator 2); wherein: rollers (engine roller 4, motor/generator roller 5, compressor roller 6) are linked to each of a rotary shaft (crankshaft 11) belonging to the first drive source (engine 1), a rotary shaft (motor shaft 12) belonging to the second drive source (motor/generator 2), and a rotary shaft (compressor shaft 13) belonging to the auxiliary device (compressor 3); idler rollers (first idler roller 7, second idler roller 8, third idler roller 9) are disposed at gap positions formed between the plurality of rollers (engine roller 4, motor/generator roller 5, compressor roller 6) linked to each of the rotary shafts (crankshaft 11, motor shaft 12, compressor shaft 13); and a roller pair selection mechanism 10 is provided that selects a power-transmitting roller pair from among the plurality of rollers (engine roller 4, motor/generator roller 5, compressor roller 6) by moving the idler rollers (first idler roller 7, second idler roller 8, third idler roller 9) in roller contact directions, thereby interposing the idler rollers (first idler roller 7, second idler roller 8, third idler roller 9) therebetween (FIG. 1). This arrangement of selecting a power-transmitting roller pair by moving the idler rollers 7, 8, 9 in contact directions makes it possible not only to minimize frictional load when the auxiliary device (compressor 3) is being driven, but also to minimize energy loss by allowing an efficient drive source (engine 1 or motor/generator 2) to be selected.

(2) The plurality of rollers (engine roller 4, motor/generator roller 5, compressor roller 6) are disposed so as to form circumferential-direction gaps around a circle centered on a central axis O constituted by a rotary shaft (selector shaft 16) of the actuator 15 provided in the roller pair selection mechanism 10; the idler rollers (first idler roller 7, second idler roller 8, third idler roller 9) are disposed so as to be capable of radial direction movement in the circumferential-direction gaps; and the roller pair selection mechanism 10 selects a power-transmitting roller pair using a cam mechanism (male cams 17, female cams 18) for converting the rotational movement of the actuator 15 to radial direction movement of the idler rollers (first idler roller 7, second idler roller 8, third idler roller 9) (FIG. 1). Thus, in addition to the effects yielded by (1), it is possible to compactly dispose the rollers 4, 5, 6 and idler rollers 7, 8, 9 in a circular region centered on the central axis O, and to select a power-transmitting roller pair using a cam mechanism employing a single actuator 15.

(3) The first drive source is the engine 1; the second drive source is the motor/generator 2; and the auxiliary device is a compressor 3 of a hybrid vehicle, the compressor 3 being driven by the engine 1 or the motor/generator 2 (FIG. 1). Thus, in addition to the effects yielded by (1) and (2), the power-transmitting roller pair selection function is used not only as a function for selecting the drive source for the compressor 3 but also as a clutch function that connects and disconnects power transmission between the engine 1 and the motor/generator 2, making it possible to accommodate the function of forming the various power transmission paths required by a hybrid vehicle.

(4) The rollers are an engine roller 4 linked to a rotary shaft (crankshaft 11) of the engine 1, a motor/generator roller 5 linked to a rotary shaft (motor shaft 12) of the motor/generator 2, and a compressor roller 6 linked to a rotary shaft (compressor shaft 13) of the compressor 3; and the idler rollers are a first idler roller 7 disposed between the engine roller 4 and the motor/generator roller 5, a second idler roller 8 disposed between the engine roller 4 and the compressor roller 6, and a third idler roller 9 disposed between the motor/generator roller 5 and the compressor roller 6, and the roller pair selection mechanism 10 comprises male cams 17 that convert rotational movement of the actuator 15 to radial direction movement of the first idler roller 7 and the second idler roller 8, and female cams 18 that convert rotational movement of the actuator 15 to radial direction movement of the third idler roller 9 (FIGS. 1-3). As a result, in addition to the effects yielded by (3), it is possible to switch between four drive transmission modes simply by controlling the rotational angle position of the actuator 15 and altering the radial direction-defining positions of the idler rollers 7, 8, 9 using the male cams 17 and the female cams 18.

(5) The roller pair selection mechanism 10 comprises a first drive transmission mode that uses a power transmission path in which the first idler roller 7 is brought into contact with the engine roller 4 and the motor/generator roller 5 (FIGS. 4, 5). Thus, in addition to the effects yielded by (4), the engine can be started using the motor/generator 2 and power can be generated using the engine 1 by selecting the first drive transmission mode.

(6) The roller pair selection mechanism 10 comprises a second drive transmission mode that uses a power transmission path in which the first idler roller 7 is brought into contact with the engine roller 4 and the motor/generator roller 5, and the second idler roller 8 is brought into contact with the engine roller 4 and the compressor roller 6 (FIG. 6). Thus, in addition to the effects yielded by (4) and (5), it is possible to simultaneously generate power and drive the air conditioner using the engine 1 by selecting the second drive transmission mode.

(7) The roller pair selection mechanism 10 comprises a third drive transmission mode using a power transmission path in which the second idler roller 8 is brought into contact with the engine roller 4 and the compressor roller 6 (FIG. 7). Thus, in addition to the effects yielded by (4)-(6), it is possible to drive the air conditioner using the engine 1 by selecting the third drive transmission mode.

(8) The roller pair selection mechanism 10 comprises a fourth drive transmission mode using a power transmission path in which the third idler roller 9 is brought into contact with the motor/generator roller 5 and the compressor roller 6 (FIG. 8). Thus, in addition to the effects yielded by (4)-(7), it is possible to drive the air conditioner using the motor/generator 2 by selecting the fourth drive transmission mode.

Embodiment 2

The second embodiment is an example in which a drive source is selected for an auxiliary device of an electric vehicle in which a main motor and a sub motor are mounted.

First, the configuration of the second embodiment will be described. The drive apparatus for a vehicle auxiliary device according to the second embodiment is applied to an electric vehicle, and a main motor 21 (first drive source), a sub motor 22 (second drive source), and a compressor 23 (auxiliary device) are mounted therein, as shown in FIG. 9. Also provided are a main motor roller 24, a sub motor roller 25, and a compressor roller 26 as drive transmission elements. Also provided are a first idler roller 28 and a second idler roller 29 as idler rollers for selecting a power transmission path. Also provided is a roller pair selection mechanism 210 for moving the idler rollers 28, 29 in a radial direction when selecting a power transmission path.

The compressor 23 compresses a heating medium in an air conditioning system for performing climate control within the vehicle cabin, and is driven by one drive source out of the main motor 21 and the sub motor 22.

The main motor roller 24 is linked to a motor shaft 211 (rotary shaft) of the main motor 21. The sub motor roller 25 is linked to a motor shaft 212 (rotary shaft) of the sub motor 22. The compressor roller 26 is linked to a compressor shaft 213 (rotary shaft) of the compressor 23. As shown in FIG. 9, the rollers 24, 25, 26 have identical diameters, and are supported at both ends so as to be rotatable with respect to a circular carrier case 214. The rollers are disposed at equal intervals (120° intervals) around a circle having a central axis O constituted by a selector shaft 216 (rotary shaft) of an actuator (not shown) provided in the roller pair selection mechanism 210. The circumferential-direction gaps formed between each two adjacent rollers of the rollers 24, 25, 26 are smaller than the diameter of the idler rollers 28, 29.

The first idler roller 28 is disposed in a circumferential-direction gap formed between the main motor roller 24 and the compressor roller 26. The second idler roller 29 is disposed in a circumferential-direction gap formed between the sub motor roller 25 and the compressor roller 26. As shown in FIG. 9, the idler rollers 28, 29 have identical diameters, and are disposed so as to be capable of radial direction movement in a first elongated hole 214a and a second elongated hole 214b opened in the carrier case 214 in the respective circumferential-direction gaps.

The roller pair selection mechanism 210 selects a power-transmitting roller pair from among the rollers 24, 25, 26 by moving an idler roller in a roller contact direction so as to interpose one of the idler rollers 28, 29 therebetween. The roller pair selection mechanism 210 comprises a male cam 217 (cam) for converting the rotational movement of the actuator (not shown) to radial direction movement of the first idler roller 28, and a female cam 218 (cam) for converting the same to radial direction movement of the second idler roller 29. The male cams 217 and the female cams 218 are provided integrally with the selector shaft 216, and a power-transmitting roller pair is selected by altering the rotational angular positions of the male cams 217 and the female cams 128 using the actuator 15, as in the first embodiment.

As shown in FIG. 9, the male cam 217 has a shape projecting in one direction, is connected to the selector shaft 216 at a cam base position, and converts rotational movement of the actuator (not shown) to radial direction movement of the first idler roller 28.

As shown in FIG. 9, the female cam 218 is a disc-shaped cam in which a recess 218b is formed at one location on a circumferential section 218a, the selector shaft 216 being connected to a central position of the disc, the female cam converting the rotational movement of the actuator (not shown) to radial direction movement of the second idler roller 29.

The roller pair selection mechanism 210 attains the following two drive transmission modes by selecting roller pairs.

(a) First drive transmission mode—A mode using a power transmission path in which the first idler roller 28 is brought into contact with the main motor roller 24 and the compressor roller 26.

(b) Second drive transmission mode—A mode using a power transmission path in which the second idler roller 29 is brought into contact with the sub motor roller 25 and the compressor roller 26.

Next, the operation of the second embodiment will be described. The description of the drive apparatus for a vehicle auxiliary device according to the second embodiment will be divided into the sections "First drive transmission mode operation" and "Second drive transmission mode operation".

First Drive Transmission Mode Operation

In the first drive transmission mode, which uses a power transmission path in which the first idler roller 28 is brought into contact with the main motor roller 24 and the compressor roller 26, the main motor air conditioning drive pattern shown in FIG. 9 is implemented. In the main motor air conditioning drive pattern, the drive source is the main motor 21, and the compressor 23 is driven.

In the main motor air conditioning drive pattern, the selector shaft 216 is rotated by the actuator (not shown) to a position at which the first idler roller 28 contacts the main motor roller 24 and the compressor roller 26, as shown in FIG. 9. In this state, the second idler roller 29 is at a non-roller-contacting position. When the rotation of the selector shaft 216 brings the first idler roller 28 into contact with the rollers 24, 26, a pressing force commensurate with the transmitted drive force is automatically generate by the wedge effect between the main motor roller 24 and the first idler roller 28. This forms a power transmission path in which torque sequentially flows from the main motor 21 through the motor shaft 211, main motor roller 24, first idler roller 28, compressor roller 26, and compressor shaft 213 to the compressor 23. As a result, the compressor shaft 213 is rotated using the main motor 21 as a drive source, allowing the compressor of the air conditioner to be driven.

Second Drive Transmission Mode Operation

Figure 10:
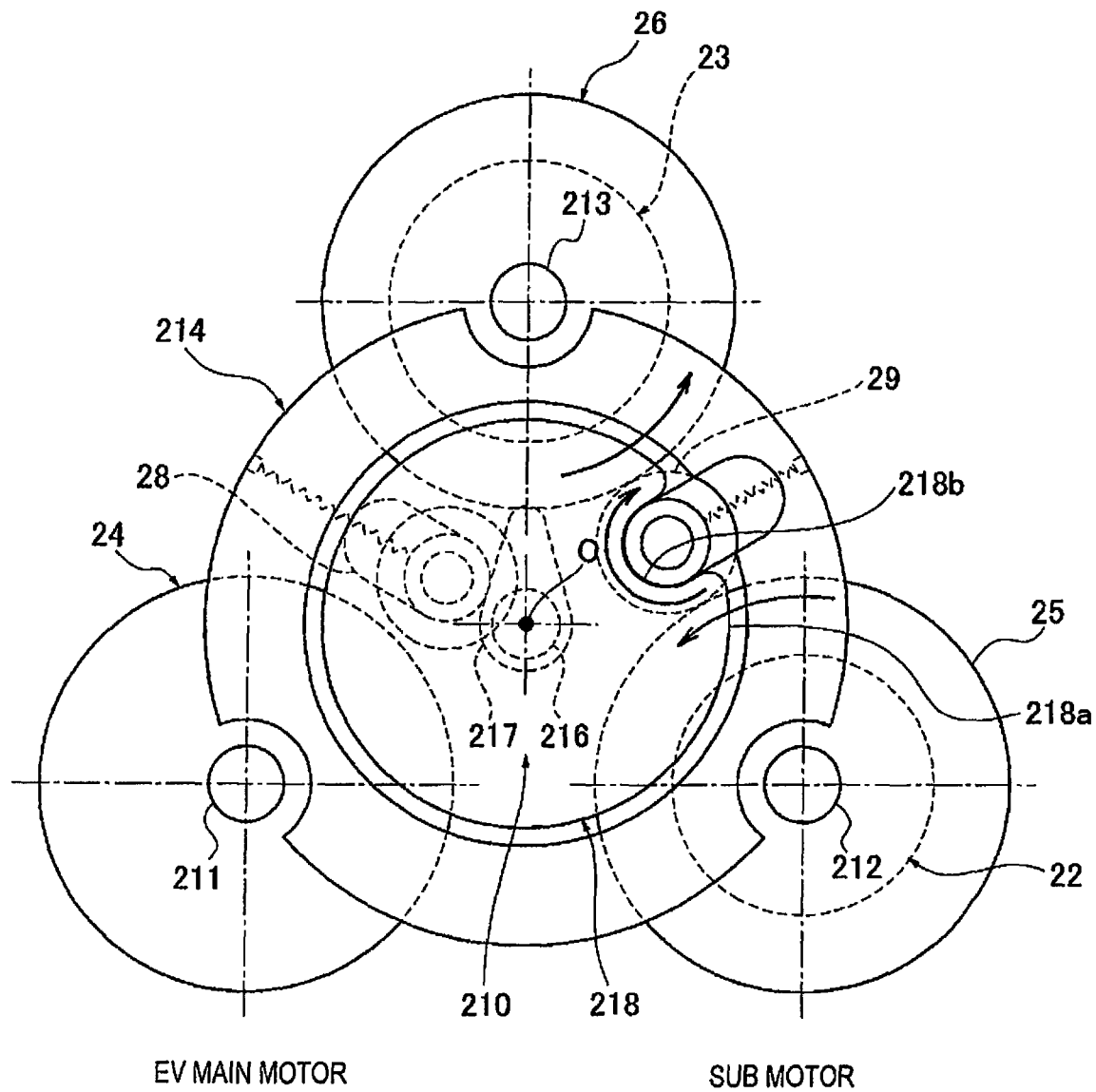
FIG. 10 is an operational illustration of a sub motor performing an air conditioner drive operation in the drive apparatus for a vehicle auxiliary device according to the second embodiment.

In the second drive transmission mode, which uses a power transmission path in which the second idler roller 29 is brought into contact with the sub motor roller 25 and the compressor roller 26, the sub motor air conditioner drive pattern shown in FIG. 10 is implemented. In the sub motor air conditioner drive pattern, the drive source is the sub motor 22, and the compressor 23 is driven.

In the sub motor air conditioner drive pattern, the selector shaft 216 is rotated by the actuator (not shown) to a position at which the second idler roller 29 contacts the sub motor roller 25 and the compressor roller 26, as shown in FIG. 10. In this state, the first idler roller 28 is at a non-roller-contacting position. When the rotation of the selector shaft 216 brings the second idler roller 29 into contact with the rollers 25, 26, a pressing force commensurate with the transmitted torque is automatically generated by the wedge effect between the sub motor roller 25 and the second idler roller 29. This form a power transmission path in which torque sequentially flows from the sub motor 22 through the motor shaft 212, sub motor roller 25, second idler roller 29, compressor roller 26, and compressor shaft 213 to the compressor 23. As a result, the compressor shaft 213 is rotated using the sub motor 22 as a drive source, allowing the compressor of the air conditioner to be driven.

In the sub motor air conditioner drive pattern, a neutral mode is implemented when the rotation of the selector shaft 216 keeps the second idler roller 29 at an angular rotational position before or after the position at which the roller falls into the recess 218b in the female cam 218 and contacts the rollers 25, 26, and the roller does not fall into the recess 218b in the angular rotational position. In other words, neither of the two idler rollers 28, 29 contacts any of the three rollers 24, 25, 26 in neutral mode. The operation of this embodiment is otherwise similar to that of the first embodiment; thus, description thereof will be omitted.

Next, the effects of the second embodiment will be described. The drive apparatus for a vehicle auxiliary device according to the second embodiment yields the following effects.

(9) The first drive source is the main motor 21; the second drive source is the sub motor 22; and the auxiliary device is a compressor 23 for an electric vehicle, the compressor being driven by the main motor 21 or the sub motor 22 (FIGS. 9 and 10). Thus, in addition to the effects yielded by (1) or (2) under the first embodiment, the power-transmitting roller pair selection function can be used as a function for selecting the drive source for the compressor 23, thereby allowing for minimized electrical power consumption and extended driving distance by selecting the more efficient drive source (main motor 21 or sub motor 22) according to the battery state, driving conditions, and the like of the electric vehicle.

The foregoing has been a description of first and second embodiments of the drive apparatus for a vehicle auxiliary device according to the present invention, but the specific configuration of the present invention is not limited to these embodiments, and various modifications and additions may be made to the design to the extent that they do not depart from the spirit of the invention as set forth in the claims.

In the first and second embodiments, the plurality of rollers linked to the rotary shafts of the drive source and auxiliary device have identical diameters and are disposed at equal intervals around a circle. However, it is also acceptable for the plurality of rollers to have different diameters and be disposed at unequal intervals in a line or raised and lowered pattern according to the on-board layout of the drive sources and the auxiliary device.

In the first and second embodiments, the actuator is rotatably driven by an electric motor. However, it is also possible to use a linearly moving actuator, such as a cylinder.

In the first and second embodiments, the roller pair selection mechanism uses a cam mechanism to convert rotary movement to linear movement in a radial direction. However, it is also acceptable for the roller pair selection mechanism to select roller pairs using a linkage mechanism or the like.

In the first and second embodiments, a compressor is used as the auxiliary device. However, an auxiliary device other than a compressor, such as a water pump, may also be used, and there may be a plurality of auxiliary devices rather than only one.

In the first embodiment, the drive apparatus for a vehicle auxiliary device according to the present invention is applied to a hybrid vehicle, and, in the second embodiment, the drive apparatus for a vehicle auxiliary device according to the present invention is applied to an electric vehicle. However, the drive apparatus for a vehicle auxiliary device according to the present invention can also be applied to other types of vehicles, such as engine vehicles. In short, the invention can be applied to any vehicle provided with two drive sources and at least one auxiliary device.

The invention claimed is:

1. A drive apparatus for a vehicle auxiliary device, the apparatus comprising:
    a first drive source having a first rotary shaft;
    a second drive source having a second rotary shaft, the second drive source being different from the first drive source;
    at least one auxiliary device having a third rotary shaft, and selectively driven by the first drive source and the second drive source;
    a first roller linked to the first rotary shaft of the first drive source;
    a second roller linked to the second rotary shaft of the second drive source;
    a third roller linked to the third rotary shaft of the auxiliary device;
    first, second and third idler rollers disposed at positions in gaps formed between the first, second and third rollers; and
    a roller pair selection mechanism movably arranged to an position that selects a power-transmitting roller pair from among the first, second and third rollers by moving an idler roller in a roller contact direction.

2. The drive apparatus according to claim 1, wherein
    the first, second and third rollers are disposed so as to form circumferential-direction gaps around a circle having a central axis constituted by a rotary shaft of an actuator provided in the roller pair selection mechanism;
    the first, second and third idler rollers are movably disposed in a radial direction movement into the circumferential-direction gaps; and
    the roller pair selection mechanism selects a power-transmitting roller pair using a cam mechanism for converting rotational movement of an actuator to radial direction movement of the first, second and third idler rollers.

3. The drive apparatus according to claim 1, wherein
    the first drive source is an engine having the first rotary shaft;
    the second drive source is a motor/generator having the second rotary shaft; and
    the auxiliary device is a compressor for a hybrid vehicle, the compressor being selectively driven by the engine and the motor/generator, and having the third rotary shaft.

4. The drive apparatus according to claim 3, wherein
    the first roller is an engine roller that is linked to the first rotary shaft of the engine, the second roller is a motor/generator roller that is linked to the second rotary shaft of the motor/generator, and the third roller is a compressor roller that is linked to the third rotary shaft of the compressor;
    the first idler roller is disposed between the engine roller and the motor/generator roller, the second idler roller that is disposed between the engine roller and the compressor roller, and the third idler roller that is disposed between the motor/generator roller and the compressor roller; and the roller pair selection mechanism comprises a male cam for converting rotational movement of an actuator to radial direction movement of the first idler roller and the second idler roller, and a female cam for converting rotational movement of the actuator to radial direction movement of the third idler roller.

5. The drive apparatus according to claim 4, wherein
the roller pair selection mechanism comprises a first drive transmission mode that uses a power transmission path in which the first idler roller is brought into contact with the engine roller and the motor/generator roller.

6. The drive apparatus according to claim 4, wherein
the roller pair selection mechanism comprises a second drive transmission mode that uses a power transmission path in which the first idler roller is brought into contact with the engine roller and the motor/generator roller, and the second idler roller is brought into contact with the engine roller and the compressor roller.

7. The drive apparatus according to claim 4, wherein
the roller pair selection mechanism comprises a third drive transmission mode that uses a power transmission path in which the second idler roller is brought into contact with the engine roller and the compressor roller.

8. The drive apparatus according to claim 4, wherein
the roller pair selection mechanism comprises a fourth drive transmission mode that uses a power transmission path in which the third idler roller is brought into contact with the motor/generator roller and the compressor roller.

9. The drive apparatus according to claim 1, wherein
the first drive source is a main motor having the first rotary shaft;
the second drive source is a sub motor having the second rotary shaft; and
the auxiliary device is a compressor for an electric vehicle, the compressor being driven by one of the main motor and the sub motor, and having the third rotary shaft.

10. The drive apparatus according to claim 2, wherein
the first drive source is a main motor having the first rotary shaft;
the second drive source is a sub motor having the second rotary shaft; and
the auxiliary device is a compressor for an electric vehicle, the compressor being driven by one of the main motor and the sub motor, and having the third rotary shaft.

11. The drive apparatus according to claim 5, wherein
the roller pair selection mechanism comprises a second drive transmission mode that uses a power transmission path in which the first idler roller is brought into contact with the engine roller and the motor/generator roller, and the second idler roller is brought into contact with the engine roller and the compressor roller.

12. The drive apparatus according to claim 5, wherein
the roller pair selection mechanism comprises a third drive transmission mode that uses a power transmission path in which the second idler roller is brought into contact with the engine roller and the compressor roller.

13. The drive apparatus according to claim 5, wherein
the roller pair selection mechanism comprises a fourth drive transmission mode that uses a power transmission path in which the third idler roller is brought into contact with the motor/generator roller and the compressor roller.

14. The drive apparatus according to claim 2, wherein
the first drive source is an engine having the first rotary shaft;
the second drive source is a motor/generator having the second rotary shaft; and
the auxiliary device is a compressor for a hybrid vehicle, the compressor being selectively driven by the engine and the motor/generator, and having the third rotary shaft.

15. The drive apparatus according to claim 14, wherein
the first roller is an engine roller that is linked to the first rotary shaft of the engine, the second roller is a motor/generator roller that is linked to the second rotary shaft of the motor/generator, and the third roller is a compressor roller that is linked to the third rotary shaft of the compressor;
the first idler roller is disposed between the engine roller and the motor/generator roller, the second idler roller that is disposed between the engine roller and the compressor roller, and the third idler roller that is disposed between the motor/generator roller and the compressor roller; and
the roller pair selection mechanism comprises a male cam for converting rotational movement of an actuator to radial direction movement of the first idler roller and the second idler roller, and a female cam for converting rotational movement of the actuator to radial direction movement of the third idler roller.

16. The drive apparatus according to claim 14, wherein
the roller pair selection mechanism comprises a first drive transmission mode that uses a power transmission path in which the first idler roller is brought into contact with the engine roller and the motor/generator roller.

17. The drive apparatus according to claim 14, wherein
the roller pair selection mechanism comprises a second drive transmission mode that uses a power transmission path in which the first idler roller is brought into contact with the engine roller and the motor/generator roller, and the second idler roller is brought into contact with the engine roller and the compressor roller.

18. The drive apparatus according to claim 14, wherein
the roller pair selection mechanism comprises a third drive transmission mode that uses a power transmission path in which the second idler roller is brought into contact with the engine roller and the compressor roller.

19. The drive apparatus according to claim 14, wherein
the roller pair selection mechanism comprises a fourth drive transmission mode that uses a power transmission path in which the third idler roller is brought into contact with the motor/generator roller and the compressor roller.

\* \* \* \* \*